(12) United States Patent
Thakar et al.

(10) Patent No.: US 12,099,603 B2
(45) Date of Patent: *Sep. 24, 2024

(54) SYSTEM AND METHOD TO DETECT DOMAIN GENERATION ALGORITHM MALWARE AND SYSTEMS INFECTED BY SUCH MALWARE

(71) Applicant: McAfee, LLC, Santa Clara, CA (US)

(72) Inventors: Neeraj Thakar, Pune (IN); Praveen Kumar Amritaluru, Chennai (IN); Vikas Taneja, Sonepat (IN)

(73) Assignee: McAfee, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/264,667

(22) Filed: Jan. 31, 2019

(65) Prior Publication Data
US 2019/0163903 A1 May 30, 2019

Related U.S. Application Data

(63) Continuation of application No. 14/466,806, filed on Aug. 22, 2014, now Pat. No. 10,198,579.

(51) Int. Cl.
*G06F 21/56* (2013.01)
*G06F 21/55* (2013.01)
(Continued)

(52) U.S. Cl.
CPC ............ *G06F 21/56* (2013.01); *G06F 21/554* (2013.01); *H04L 61/4511* (2022.05);
(Continued)

(58) Field of Classification Search
CPC .... G06F 21/56; G06F 21/554; H04L 61/1511; H04L 63/1425; H04L 63/1408; H04L 2463/144
See application file for complete search history.

(56) References Cited

U.S. PATENT DOCUMENTS

| | | | |
|---|---|---|---|
| 7,649,478 B1 * | 1/2010 | Yoon | H03M 11/08 341/67 |
| 8,260,914 B1 | 9/2012 | Ranjan | |

(Continued)

FOREIGN PATENT DOCUMENTS

| | | |
|---|---|---|
| CN | 101800746 | 8/2010 |
| CN | 102833258 | 12/2012 |

(Continued)

OTHER PUBLICATIONS

Manos Antonakakis et al., "From Throw-away Traffic to Bots: Detecting the Rise of DGA-Based Malware," Aug. 8-10, 2012, pp. 491-506. (Year: 2012).*

(Continued)

*Primary Examiner* — Luu T Pham
*Assistant Examiner* — Canh Le
(74) *Attorney, Agent, or Firm* — HANLEY, FLIGHT & ZIMMERMAN, LLC (57) ABSTRACT

Systems and methods for detection of domain generated algorithms (DGA) and their command and control (C&C) servers are disclosed. In one embodiment, such an approach includes examining DNS queries for DNS resolution failures, and monitoring certain set of parameters such as number of levels, length of domain name, lexical complexity, and the like for each failed domain. These parameters may then be compared against certain thresholds to determine if the domain name is likely to be part of a DGA malware. Domain names identified as being part of a DGA malware may then be grouped together. Once a DGA domain name has been identified, activity from that domain name can be monitored to detect successful resolutions from the same source to see if any of the successful domain resolutions match these parameters. If they match specific (Continued)

thresholds, then the domain is determined to be a C&C server of the DGA malware and may be identified as such.

15 Claims, 7 Drawing Sheets (51) Int. Cl.
    *H04L 9/40*               (2022.01)
    *H04L 61/4511*       (2022.01)
(52) U.S. Cl.
    CPC ...... *H04L 63/1408* (2013.01); *H04L 63/1425* (2013.01); *H04L 2463/144* (2013.01)

(56) References Cited

U.S. PATENT DOCUMENTS

| | | | |
|---|---|---|---|
| 8,555,388 B1* | 10/2013 | Wang | H04L 69/22 713/188 |
| 10,198,579 B2 | 2/2019 | Thakar et al. | |
| 2004/0064561 A1* | 4/2004 | Parsons | H04L 29/12594 709/226 |
| 2004/0260922 A1 | 12/2004 | Goodman | |
| 2010/0036829 A1 | 2/2010 | Leyba | |
| 2010/0223144 A1 | 9/2010 | Lee | |
| 2010/0223278 A1 | 9/2010 | Lee | |
| 2011/0167495 A1 | 7/2011 | Antonakakis et al. | |
| 2012/0084860 A1* | 4/2012 | Cao | H04L 63/1441 726/23 |
| 2012/0117621 A1 | 5/2012 | Kondamuru et al. | |
| 2013/0174254 A1 | 7/2013 | Gould et al. | |
| 2013/0191915 A1 | 7/2013 | Antonakakis et al. | |
| 2013/0318603 A1* | 11/2013 | Merza | A61G 17/041 726/22 |
| 2014/0068043 A1* | 3/2014 | Archbold | H04L 61/1511 709/223 |
| 2014/0090058 A1 | 3/2014 | Ward et al. | |
| 2014/0196144 A1 | 7/2014 | Trost | |
| 2016/0065597 A1* | 3/2016 | Nguyen | H04L 63/1441 726/22 |

FOREIGN PATENT DOCUMENTS

| | | |
|---|---|---|
| CN | 103314566 | 9/2013 |
| CN | 103701765 | 4/2014 |
| CN | 103838812 | 6/2014 |
| RU | 2378692 C2 | 1/2010 |
| RU | 2495486 C1 | 10/2013 |

OTHER PUBLICATIONS

Hachem Guerid, et al. "Privacy-Preserving Domain-Flux Botnet Detection in a large Scale Network," 2024, pp. 1-9. (Year: 2024).*
Sandeep Yadav et al., Detecting Algorithmically Generated Domain-Flux Attacks With DNS Traffic Analysis, 2012, pp. 1663-1667. (Year: 2012).*
United States Patent and Trademark Office, "Decision on Appeal," issued in connection with U.S. Appl. No. 14/466,806, on Jul. 9, 2018, 11 pages.
Patent Cooperation Treaty, "International Preliminary Report on Patentability," issued in connection with International Application No. PCT/US2015/037137, on Feb. 28, 2017, 9 pages.
United States Patent and Trademark Office, "Requirement for Restriction/Election," issued in connection with U.S. Appl. No. 14/466,806, on Oct. 21, 2015, 7 pages.
European Patent Office, "Communication pursuant to Rules 70(2) and 70a(2) EPC," issued in connection with European Application No. 15834495.2, on Feb. 27, 2018, 1 pages.
United States Patent and Trademark Office, "Office Communication," issued in connection with U.S. Appl. No. 14,466,806, on Feb. 11, 2016, 2 pages.
Krishnan et al., "Crossing the Threshold: Detecting Network Malfeasance via Sequential Hypothesis Testing," 43rd Annual IEEE/IFIP International Conference on Dependable Systems and Networks, on Jun. 2013, 12 pages.
European Patent Office, "European Search Report," issued in connection with European Application No. 15834495.2, on Feb. 8, 2018, 11 pages.
Passerini et al., "FluXOR: Detecting and Monitoring Fast-Flux Service Networks," Detection of Intrusions and Malware, and Vulnerability Assessment. Springer Berlin Heidelberg, Series vol. 5137, 2008, pp. 186-206, Series ISSN 0302-9743.
Yadav et al., "Detecting Algorithmically Generated Domain-Flux Attacks with DNS Traffic Analysis," IEE/ACM Transactions on Networking, vol. 20, No. 5, Oct. 2012, 16 pages.
Antonakakis et al., "From Throw-Away Traffic to Bots: Detecting the Rise of DGA-Based Malware," In: 21st USENIX Security Symposium, Bellevue, WA, USA, Aug. 8-10, 2012, pp. 491-506.
Schiavoni et al., "Tracking and Characterizing Botnets Using Automatically Generated Domains," arXiv:1311.5612 [cs.CR], Nov. 21, 2013, 14 pages.
Ma et al., "Beyond Blacklists: Learning to Detect Malicious Web Sites from Suspicious URLS," KDD'09, Jun. 28-Jul. 1, 2009, Paris, France, 10 pages.
Yadav et al., "Winning with DNS Failures: Strategies for Faster Botnet Detection," In: 7th International ICST Conference, SecureComm 2011, London, UK, Sep. 7-9, 2011, pp. 1-10.
Patent Cooperation Treaty, "International Search Report and Written Opinion," issued in connection with International Application No. PCT/US2015/037137, on Oct. 7, 2015, 14 pages.
The Russian Federation, "Official Action," issued in connection with Russian Application No. 2017101889, on Mar. 7, 2018, 15 pages. (English Translation Included.).
United States Patent and Trademark Office, "Non-Final Office action," issued in connection with U.S. Appl. No. 14/466,806, on Feb. 4, 2016, 71 pages.
United States Patent and Trademark Office, "Final Office action," issued in connection with U.S. Appl. No. 14/466,806, on Sep. 23, 2016, 21 pages.
United States Patent and Trademark Office, "Notice of Allowance," issued in connection with U.S. Appl. No. 14,466,806, on Sep. 21, 2018, 9 pages.
United States Patent and Trademark Office, "Notice of Panel Decision from Pre-Appeal Brief Review," Issued in connection with U.S. Appl. No. 14/466,806, on Feb. 1, 2017, 2 pages.
Mowbray et al., "Finding Domain-Generation Algorithms by Looking at Length Distributions," 2014 IEEE International Symposium on Software Reliability Engineering Workshops, IEEE Computer Society, on Dec. 15, 2014, 6 pages.
Stevanovic et al., "An Efficient Flow-Based Botnet Detection Using Supervised Machine Learning," 2014 International Conference on Computing, Networking and Communications (ICNC), on Apr. 10, 2014, 5 pages.
China National Intellectual Property Administration, "Office Action," issued in connection with application No. 201580040345.2, on Feb. 2, 2019, 10 pages.
China National Intellectual Property Administration, "Second Office Action," issued in connection with application No. 201580040345.2, on Oct. 22, 2019, 11 pages.
China National Intellectual Property Administration, "Office Action" issued in connection with Chinese Patent Application No. 201580040345.2, dated Oct. 28, 2020 (4 pages).
China National Intellectual Property Administration, "Third Office Action," issued in connection with application No. 201580040345.2, dated May 6, 2020, 7 pages.

* cited by examiner

SYSTEM AND METHOD TO DETECT DOMAIN GENERATION ALGORITHM MALWARE AND SYSTEMS INFECTED BY SUCH MALWARE

This patent arises from a continuation of U.S. patent application Ser. No. 14/466,806, filed Aug. 22, 2014, entitled SYSTEM AND METHOD TO DETECT DOMAIN GENERATION ALGORITHM MALWARE AND SYSTEMS INFECTED BY SUCH MALWARE. U.S. patent application Ser. No. 14/466,806 is hereby incorporated by reference herein in its entirety.

TECHNICAL FIELD

This disclosure relates generally to network security management and in particular to systems and methods for detecting malwares that use domain generation algorithms and identifying systems that are infected by such malware.

BACKGROUND

Computer networks that interact with other networks are constantly exposed to malware, or malicious software, such as viruses, worms, botnets and Trojan horses, which are built to infiltrate every level of the computer software architecture. As mechanisms for detecting these malwares have been developed and improved, so have the numbers and variety of the malicious software. One type of malware which has increased in use in recent year relies on a domain generation algorithm (DGA) to create thousands of domain names that contact a Command and Control (C&C) channel. The C&C channel includes a C&C server which is the domain name the malware author has control over. Most of the generated domain names are random strings that are not valid domain names. However, the algorithm creates enough domain names that eventually some valid domain names are generated and out of these valid domain names eventually the C&C server is found and contacted.

By using only one C&C server, this type of malware helps the malware author maintain a small but agile physical C&C infrastructure that only needs to be configured and turned on for short periods of time. This helps malware authors keep their botnets alive for a longer period of time and prevent take downs. Moreover, the bot herder needs to register just one domain name out of the many domain names generated by the DGA to run such an operation. This helps malware authors establish a large infection base without exposing the C&C infrastructure. As a result, such malwares are highly effective and very difficult to detect.

This type of malware also makes it very difficult for static reputation systems to maintain an accurate list of all possible C&C domains. Moreover, traditional blacklisting mechanisms generally do not work in such cases. The following disclosure addresses these and other issues.

DESCRIPTION OF DISCLOSED EMBODIMENTS

DGA based malwares often use a large number of domain name server (DNS) queries of randomly generated domain names to look for their C&C sever. During that process, they usually generate a large number of DNS queries to non-existent (NX) Domains. To effectively detect such algorithms, a process may be used to examine DNS queries for such NX domains (i.e. DNS resolution failures), and monitor certain set of parameters such as number of levels, length of domain name, lexical complexity, and the like for each of these NX domains. These parameters may then be compared against certain thresholds to determine if the domain name is likely to be part of a DGA malware. Domain names identified as being part of a DGA malware may then be grouped together. Once a DGA domain name has been identified, activity from the source IP of the domain name can be monitored to detect successful resolutions from the same source to see if any of the successful domain resolutions match certain specific parameters. If they match the specific parameters, then the domain is determined to be a C&C server of the DGA malware and may be identified as such.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a programmable device" can refer to a single programmable device or a plurality of programmable devices working together to perform the function described as being performed on or by a programmable device.

Figure 1:
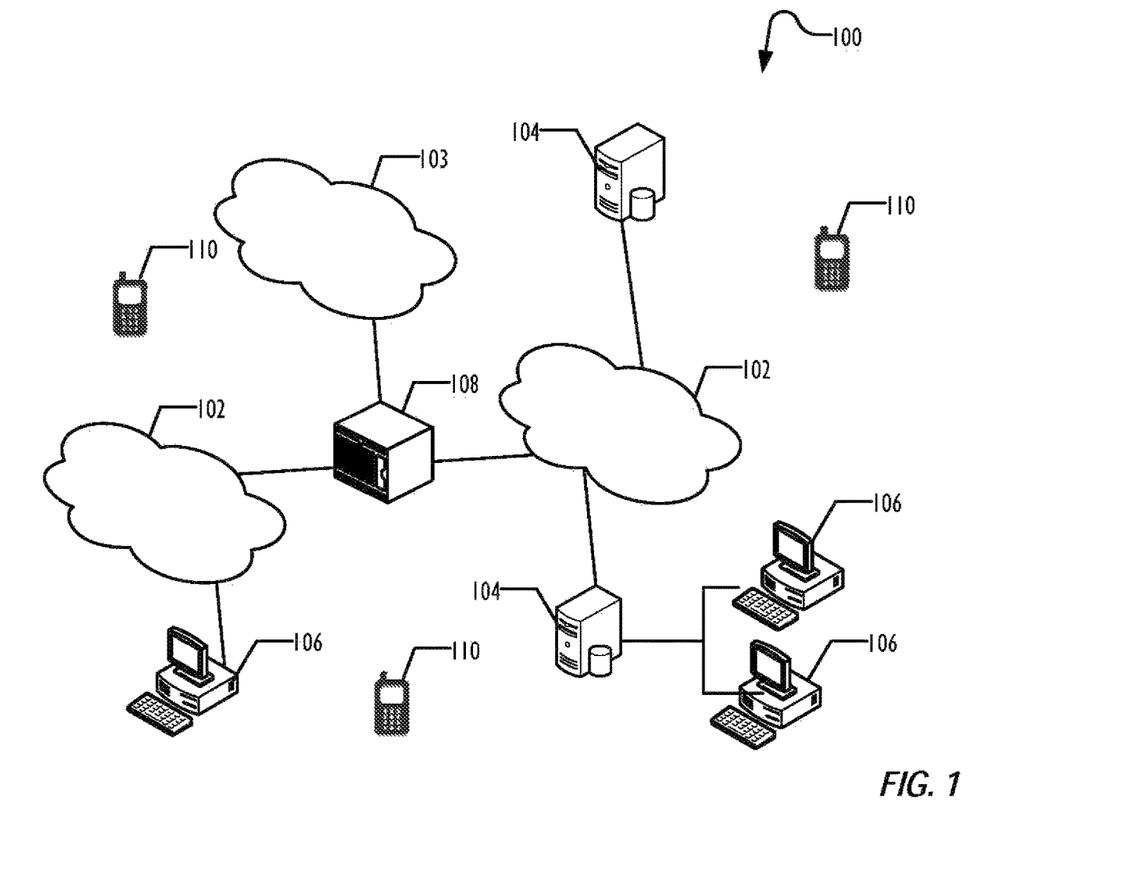
FIG. 1 is a block diagram illustrating a network architecture infrastructure according to one or more disclosed embodiments.

Referring now to FIG. 1, an example infrastructure 100 is shown schematically. Infrastructure 100 contains computer networks 102 which may include many different types of computer networks available today, such as the Internet, a corporate network, or a Local Area Network (LAN). Each of these networks can contain wired or wireless devices and operate using any number of network protocols (e.g., TCP/

IP). Networks 102 are connected to gateways and routers (represented by 108), end user computers 106 and computer servers 104. Also shown in infrastructure 100 is a cellular network 103 for use with mobile communication devices. As is known in the art, mobile cellular networks support mobile phones and many other types of devices (e.g., tablet computers not shown). Mobile devices in the infrastructure 100 are illustrated as mobile phones 110.

In a network such as displayed in FIG. 1, network activity can be monitored and analyzed to detect DGA malware in accordance with one or more embodiments disclosed herein. One or more software programs or appliances may be used to monitor and analyze network activity and conduct an analysis of NX domains in the network to detect DGA malware and identify its source.

Figure 2:
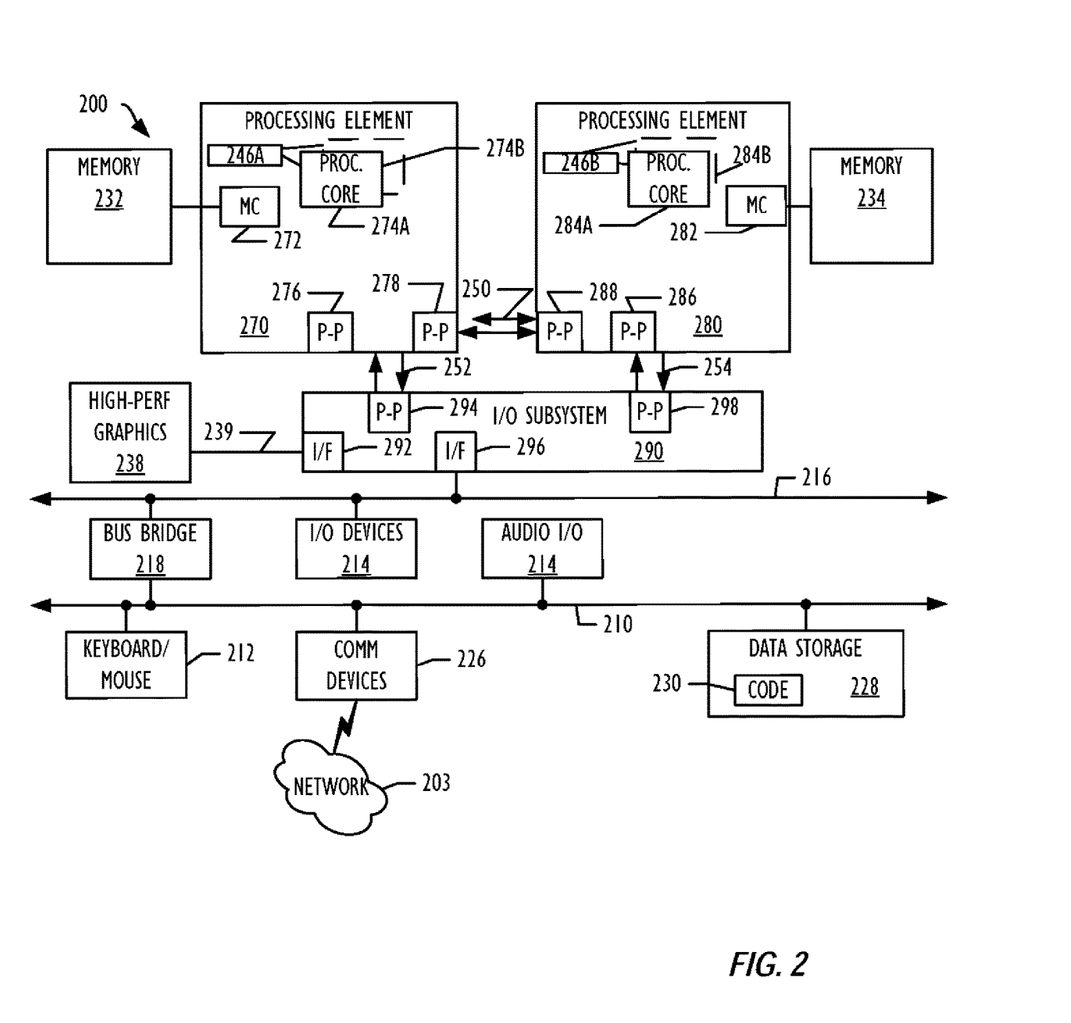
FIG. 2 is a block diagram illustrating a programmable device for use with techniques described herein according to one embodiment.

Referring now to FIG. 2, a block diagram illustrates a programmable device 200 that may employ the malware detection approach in accordance with one embodiment. The programmable device illustrated in FIG. 2 is a multi-processor programmable device 200 that includes a first processing element 270 and a second processing element 280. While two processing elements 270 and 280 are shown, an embodiment of programmable device 200 may also include only one such processing element.

Programmable device 200 is illustrated as a point-to-point interconnect system, in which the first processing element 270 and second processing element 280 are coupled via a point-to-point interconnect 250. Any or all of the interconnects illustrated in FIG. 2 may be implemented as multi-drop bus rather than point-to-point interconnects.

As illustrated in FIG. 2, each of processing elements 270 and 280 may be multicore processors, including first and second processor cores (i.e., processor cores 274a and b and processor cores 284a and 284b). Such cores 274a, 274b, 284a, 284b may be configured to execute instruction code in a manner disclosed herein in connection with FIGS. 4 and 5. However, other embodiments may use processing elements that are single core processors as desired. In embodiments with multiple processing elements 270, each processing element may be implemented with different numbers of cores as desired.

Each processing element 270, 280 may include at least one shared cache 246. The shared cache 246a, 246b may store data (e.g., instructions) that are utilized by one or more components of the processing element, such as the cores 274a, 274b and 284a, 284b, respectively. For example, the shared cache may locally cache data stored in a memory 232, 234 for faster access by components of the processing elements 270, 280. In one or more embodiments, the shared cache 246a, 246b may include one or more mid-level caches, such as level 2 (L2), level 3 (L3), level 4 (L4), or other levels of cache, a last level cache (LLC), or combinations thereof.

While FIG. 2 illustrates a programmable device with two processing elements 270, 280 for clarity of the drawing, the scope of the present invention is not so limited and any number of processing elements may be present. Alternatively, one or more of processing elements 270, 280 may be an element other than a processor, such as an graphics processing unit (GPU), a digital signal processing (DSP) unit, a field programmable gate array, or any other programmable processing element. Processing element 280 may be heterogeneous or asymmetric to processing element 270. There can be a variety of differences between the processing elements 270, 280 in terms of a spectrum of metrics of merit including architectural, microarchitectural, thermal, power consumption characteristics, and the like. These differences may effectively manifest themselves as asymmetry and heterogeneity amongst the processing elements 270, 280. In some embodiments, the various processing elements 270, 280 may reside in the same die package.

First processing element 270 may further include memory controller logic (MC) 272 and point-to-point (P-P) interconnects 276 and 278. Similarly, second processing element 280 may include a MC 282 and P-P interconnects 286 and 288. As illustrated in FIG. 2, MCs 272 and 282 couple the processing elements 270, 280 to respective memories, namely a memory 232 and a memory 234, which may be portions of main memory locally attached to the respective processors. While MC logic 272 and 282 is illustrated as integrated into the processing elements 270, 280, in some embodiments the MC logic may be discrete logic outside the processing elements 270, 280 rather than integrated therein.

Processing element 270 and processing element 280 may be coupled to an I/O subsystem 290 via P-P interconnects 276, 286 and 284, respectively. As illustrated in FIG. 2, I/O subsystem 290 includes P-P interconnects 294 and 298. Furthermore, I/O subsystem 290 includes an interface 292 to couple I/O subsystem 290 with a high performance graphics engine 238. In one embodiment, bus 249 may be used to couple graphics engine 238 to I/O subsystem 290. Alternately, a point-to-point interconnect 239 may couple these components.

In turn, I/O subsystem 290 may be coupled to a first link 216 via an interface 296. In one embodiment, first link 216 may be a Peripheral Component Interconnect (PCI) bus, or a bus such as a PCI Express bus or another I/O interconnect bus, although the scope of the present invention is not so limited.

As illustrated in FIG. 2, various I/O devices 214 may be coupled to first link 216, along with a bridge 218 which may couple first link 216 to a second link 210. In one embodiment, second link 220 may be a low pin count (LPC) bus. Various devices may be coupled to second link 220 including, for example, a keyboard/mouse 212, communication device(s) 226 (which may in turn be in communication with the computer network 203), and a data storage unit 228 such as a disk drive or other mass storage device which may include code 230, in one embodiment. The code 230 may include instructions for performing embodiments of one or more of the techniques described above.

Note that other embodiments are contemplated. For example, instead of the point-to-point architecture of FIG. 2, a system may implement a multi-drop bus or another such communication topology. Although links 216 and 220 are illustrated as busses in FIG. 2, any desired type of link can be used. Also, the elements of FIG. 2 may alternatively be partitioned using more or fewer integrated chips than illustrated in FIG. 2.

Figure 3:
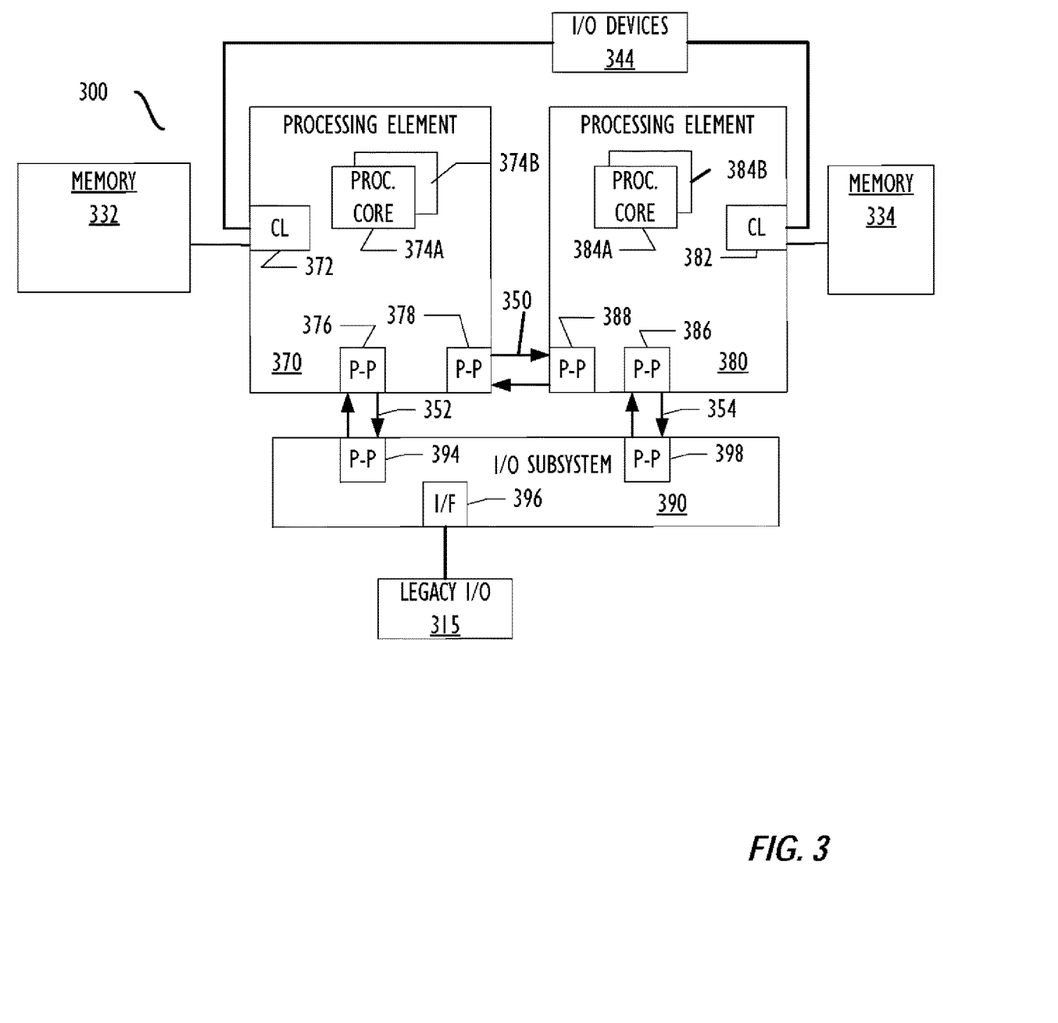
FIG. 3 is a block diagram illustrating a programmable device for use with techniques described herein according to another embodiment.

Referring now to FIG. 3, a block diagram illustrates a programmable device 300 according to another embodiment. Certain aspects of FIG. 2A have been omitted from FIG. 3 in order to avoid obscuring other aspects of FIG. 3.

FIG. 3 illustrates that processing elements 370, 380 may include integrated memory and I/O control logic ("CL") 372 and 382, respectively. In some embodiments, the CL 372, 382 may include memory control logic (MC) such as that described above in connection with FIG. 2. In addition, CL 372, 382 may also include I/O control logic. FIG. 3 illustrates that not only may the memories 332, 334 be coupled to the CL 372, 382, but also that I/O devices 314 may also be coupled to the control logic 372, 382. Legacy I/O devices 315 may be coupled to the I/O subsystem 390.

The programmable devices depicted in FIGS. 2 and 3 are schematic illustrations of embodiments of programmable devices which may be utilized to implement various embodiments discussed herein. It will be appreciated that various components of the programmable devices depicted in FIGS. 2 and 3 may be combined in a system-on-a-chip (SoC) architecture.

Embodiments of the inventions disclosed herein may include software. As such, we shall provide a description of common computing software architecture. Like the hardware examples, the software architecture discussed here is not intended to be exclusive in any way but rather illustrative.

We now turn to a discussion of various embodiments for detecting DGA malwares and their C&C servers. Malware that use DGAs often generate a large number of random domain names to use for making domain name server (DNS) queries that lead to locating their C&C sever. During that process, they often generate and make a large number of DNS queries to non-existent (NX) domains. For example, one known DGA malware referred to as the Simda Bot generates the following domain names, among others: qedysov.com; lykyjad.com; lymywaj.com; vocyzit.com; vopycom; lykymox.com; vojyqem.com; vofycot.com; vocyruk.com; lyvylyn.com; gacynuz.com; lysyfyj.com; qegynuv.com; gadyveb.com; vowypit.com. Similarly, a DGA malware referred to as the Zeus Botnet uses hundreds of domains such asjbcyxsgqovvucifaqbadagqeadx.net; alnzkrgiswthigasorkovkqw.info; cqzllwsprhdercfqwsql.com; tcttwpnwstgzddtghvswkvhabi.ru; tltitoulfscinsciffebir.com; lqsvgygmhpcejnxyppjzhnbdq.info; jirizaqxktnkzroljuwuwtcsyl.org; and strcxgeujzpnwsveushudahafalv.net.

As can be seen from the above example domain names, these domain names are non-existent domain names that are merely random strings of characters. In one embodiment, by using a process that monitors network activity and analyzes DNS responses, NX domains may be identified and examined to determine their randomness. One such a process is described in the flow charts of FIGS. 4A-4B.

Figure 4A:
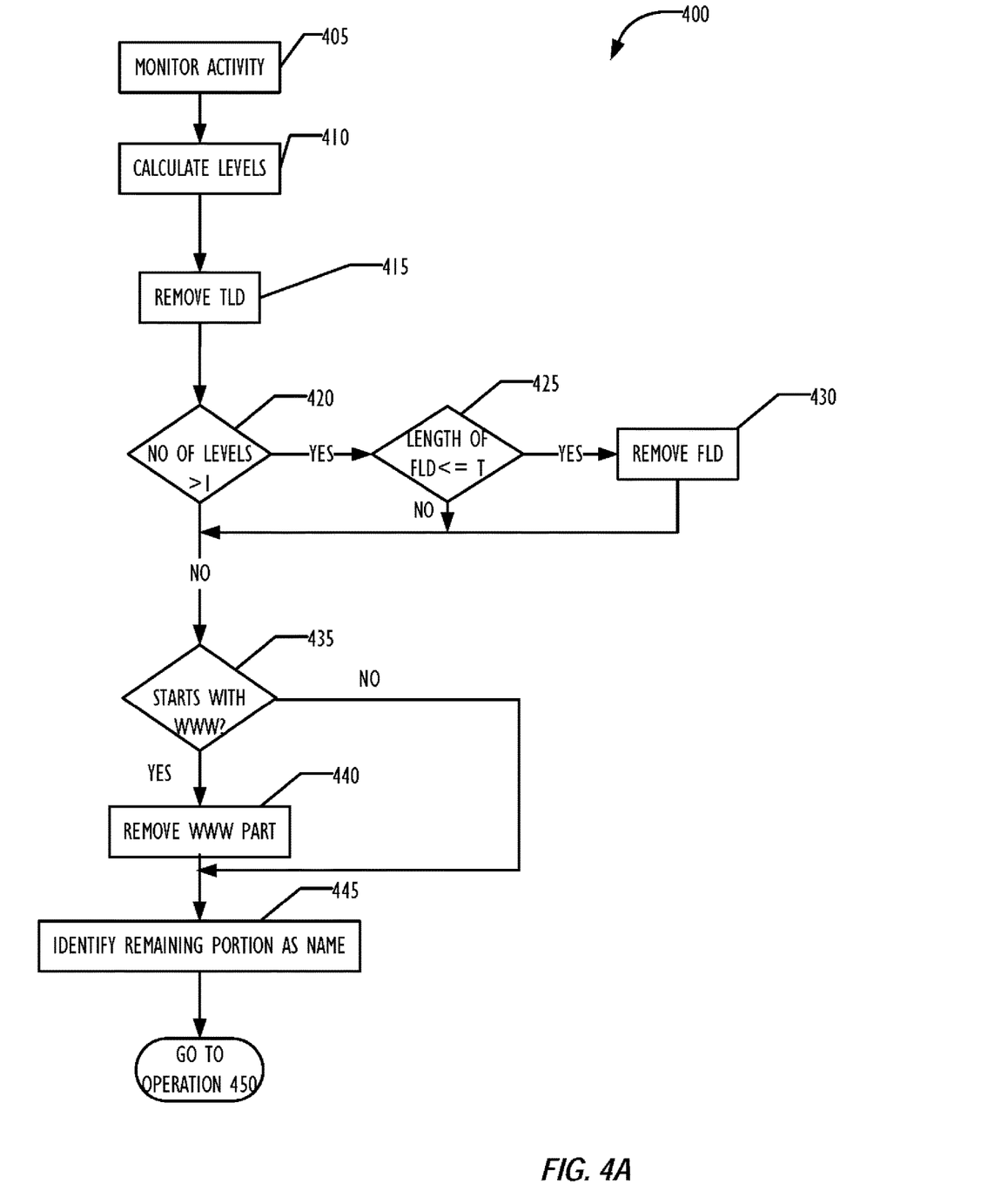
FIG. 4A-4B are flow diagrams of an algorithm for calculating a lexical complexity score for a given domain name according to one or more disclosed embodiments.

Referring to FIG. 4A, an operation 400 for detecting DGA based domains may start by monitoring network activity to detect an NX domain (block 405). Once an NX domain has been detected, the operation calculates the number of levels present in the domain name (DN) (block 410). This may be done, in one embodiment, by splitting the domain name to different parts. The splitting may be done on each dot in the string. For example, the domain name abc.com is calculated as having two levels, a top level domain (TLD) of ".com" and a first level domain (FLD) of "abc." After the number of levels for the domain name has been calculated, the operation proceeds to identify which part of the domain name is the actual name part. For example, in the above example of abc.com, the operation should identify "abc" as the name part. This is done, in one embodiment, by first removing the TLD (block 415). In the abc.com example, this means removing the ".com" part. After the TLD has been removed, the operation determines if the number of remaining levels in the domain name is larger than one (block 420). If there are more than one levels remaining in the domain name, the length of the FLD is then examined to determine if the number of characters in the FLD is equal to or less than a specified threshold number (block 425). In one embodiment, this threshold number is 3. Thus, for example for the domain name of abc.com.au, this process first identifies and removes ".au" as the TLD and then examines the FDL "com" to determine if the number of characters in it is equal to or less than 3, which in this case is true. When the FDL is identified as having a number of characters equal to or less than the threshold, the FDL is removed (block 430). This is because in general having a number of characters that is less than or equal to a predetermined threshold indicates that this part of the domain name is not part of the actual name.

When the number of levels is not larger than one (i.e., only one level is left after removing the TDL), the number of characters in the FDL ise not less than or equal to the specified threshold, or after the FLD has been removed, the operation determines if the domain name starts with the pretext characters "www" (block 435). If so, the "www" part is removed (block 440). When the domain name does not start with "www" or after the "www" part has been removed, the remaining part of the domain name is identified as the name part (block 445) and the operation moves to operation 450 of FIG. 4B.

Now that the actual name part is identified, the operation moves to determine whether or not the name part is a random string of characters. This is done, in one embodiment, by operation 450 of FIG. 4B. Operation 450 beings by calculating the length of the name (block 455) and then parsing the name in order to calculate a lexical complexity score (block 460). The name is parsed by selecting the first N characters of the name. N is a predetermined number generally selected as the minimum number of characters that can form a valid word. In one embodiment, N is selected as 2. In an alternative embodiment, N is selected as 3. Other variations are also possible. Once the first N characters are selected, the operation determines if the selected part is a valid word (block 465). This may be done, for example, by looking up the selected part in one or more dictionaries. If the selected part is determined to be a valid word, it is stored as a valid word (block 470). Whether a valid word is found and stored or a valid word is not found, the operation continues to block 475 to determine if N is equal to the calculated length of the name part (block 475). If it is not, that means the name has not been completely parsed. As such, the operation sets N equal to N+1 (block 480) so that one more character is added to the selected part when the word is parsed again (block 460).

Figure 4B:
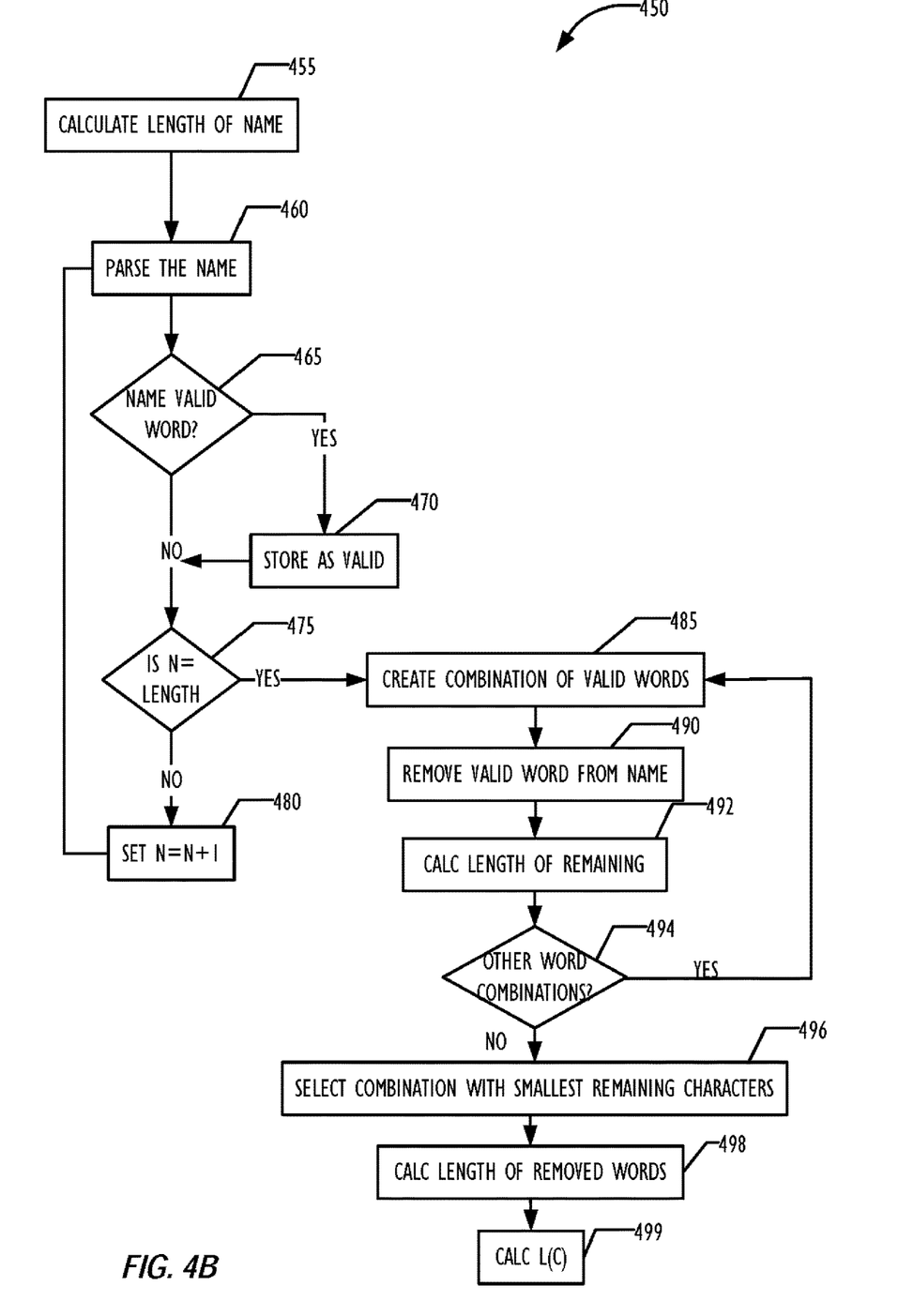

When N equals the length of the name part, that indicates that the entire name has been parsed and looked up. In this case, the operation moves to create combinations of the stored valid words (block 485), and then removes the valid words from the name part (block 490) to end up with remaining characters which do not form any valid words. The length of the remaining characters is then calculated for that word combination (block 492). The operation then determines if any other valid word combinations are possible (block 494). If so, the operation returns to block 485 to create the repeat the process. When all valid word combinations have been created and remaining characters calculated, the operation selects the word combination which results in the least number of remaining characters (block 496). In this manner, for the domain name of finalcrashtest.com, possible valid words may be determined as fin, final, crash, rash, ash, test, and est. Various combinations of these words may be put together. However, the combination with the least number of remaining characters is the one where final, crash, and test are selected, and that would be the combination the operation selects. The operation then moves to calculate the length of the removed valid words (block 498) for the selected combination and uses that length to calculate the lexical complexity score L(c) (block 499). This score is a value with a specific given range that shows how lexically complex the domain name is. In effect the lexical complexity score provides an indication of the likelihood that the domain name is made up of valid words and is not merely random characters. In one embodiment the score is a number between zero and one. The lexical complexity score may be calculated by dividing the total length of valid words in the name by the total length of the name. This score provides an indication as to the randomness of the domain name.

Once the lexical complexity score of a domain name has been calculated, the information can be used to determine if the domain name is a DGA generated domain name. This is because a large number of DGA generated domain names are merely random string of characters. Thus randomness is a strong indication that a domain name may be DGA generated. The lexical complexity score is used, in one embodiment, by performing the steps of operation 500 of FIG. 5 to determine if the domain name is DGA generated.

Figure 5:
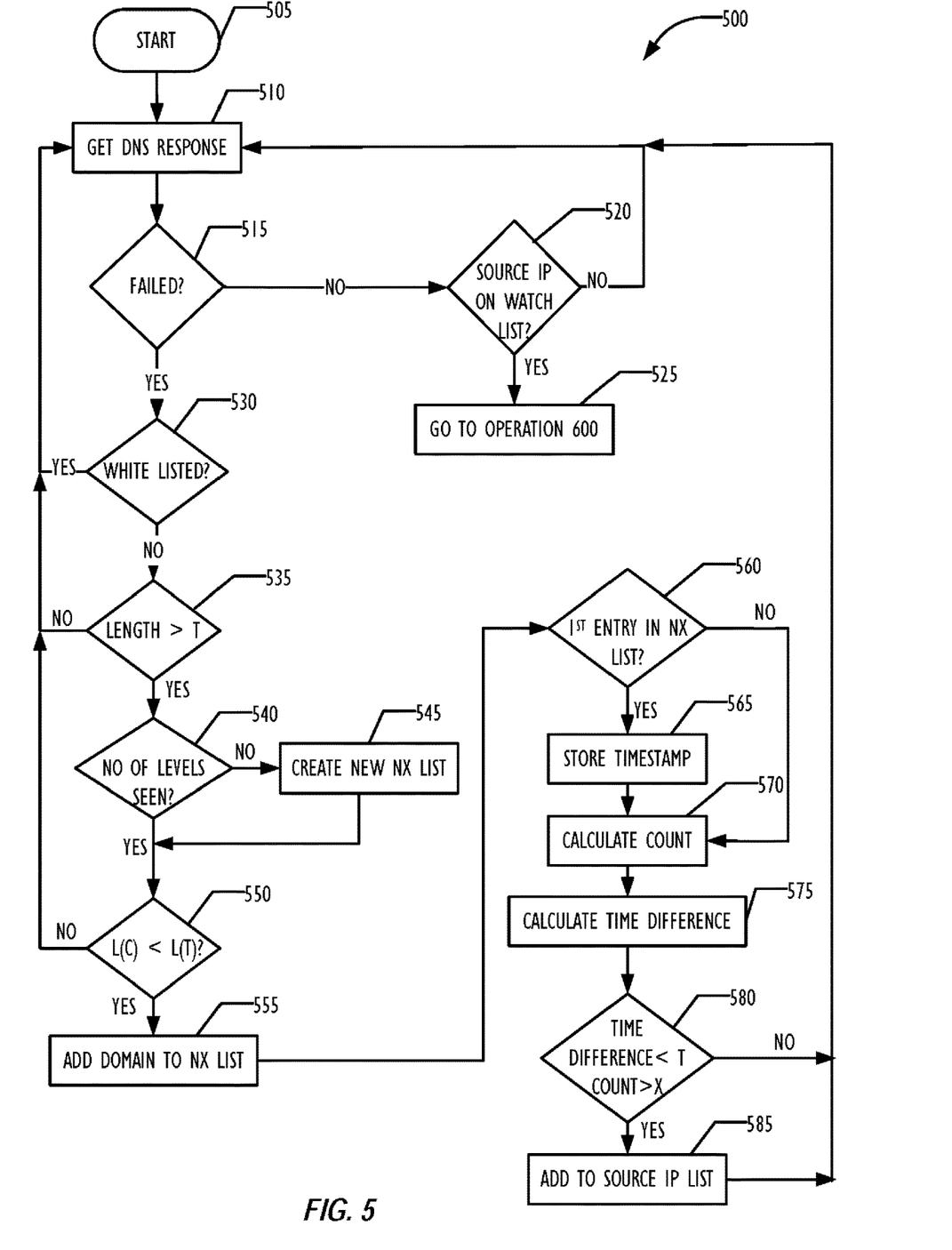
FIG. 5 is a flow diagram for determining whether a domain name is generated by a DGA according to one or more disclosed embodiments

After operation 500 begins (block 505), it tries to get a DNS response for the domain name (block 510) and checks to see if the response indicates a failed or successful resolution (block 515). If the DNS response indicates that the domain name resulted in a successful resolution, the operation checks to see if the source IP list for the domain name is on a watch list (block 520). When the source IP is not on a watch list, the operation moves back to block 505 to examine the next domain name. This is because a successfully resolved domain name which is not on a source IP watch list is generally not DGA generated and not related to a DGA. However, if the source IP list of the domain name is on a watch list, then the domain name could possibly be the C&C server associated with a DGA. As such, the operation moves to operation 600 of FIG. 6 to determine if the domain name is a C&C server (block 525).

When the domain name results in a failed resolution in block 510, the operation checks to see if the domain name is a white listed domain name (block 530). If so, the domain name is identified as not being DGA related and the operation moves back to block 505 to examine the next domain name. In one embodiment, when the domain name is not white listed, the operation checks to see if the length of the domain name is larger than a specified threshold (block 535). This may be done to help prevent detection of false positives based on empirical data. Tests have shown that DGA domain names generally have a domain name that is larger than a specific length threshold. As such, the specific length threshold is used to help prevent false detections. For example, in one embodiment the specified threshold is 5 and the operation checks to see if the length is larger than 5. When the length is larger than the specified threshold, the operation moves back to block 505 to examine the next domain name. If the length is smaller than the specified threshold, then the operation checks to see if the number of levels in the domain name has previously been encountered (block 540). For example if there are three levels in the domain name, the operation determines if there are any NX lists for domains with three levels. If the number of levels has not been previously seen, then the operation creates a new NX domain list for this number of levels (block 545). When the number of levels has already been encountered, the operation moves to determine if the lexical complexity score L(c) is lower than a specified lexical complexity threshold L(t) (block 550). In one embodiment, the threshold is empirically determined based on the average score generated by clean domain names in a given network. Other alternative approaches for determining the average score may also be used. If the lexical complexity score of the current domain name is larger than the threshold, then the domain name is determined to not be a DGA domain name and the operation moves back to block 505 to examine the next domain name.

When the lexical complexity score is smaller than the lexical complexity threshold, then it is likely that the domain name is a DGA generated and as such, it is added to the NX domain list for that source IP (block 555). The operation then determines if this is the first entry into the NX domain list for this particular source IP (block 560). If it is the first entry, then the timestamp for the first entry into the NX list is stored (block 565). When the entry is not the first entry or after the time stamp for the first entry has been stored, the operation calculates the number of domain names in the NX domain list (block 570) and then calculates the time difference between the current entry and the time stamp for the first entry (block 575). The operation then determines if the time difference is smaller than a specified threshold and if the count is larger than a specified threshold X (block 580). If both are true, the domain name is identified as a DGA generated domain name and the source IP is added to a source IP watch list (block 585). In such a manner, the system generating the domain name is identified as being infected by a DGA malware.

The check to determine if the time difference is smaller than a specified threshold and if the count is larger than a specified threshold X is done to determine the number of identified NX domains occurring in a certain time threshold. If this number is higher than the certain predetermined threshold, X, then it is likely that these domain names are generated by a DGA. In one embodiment, the values for the time threshold T and the count X are determined based on the type of network being monitored. The values may also be empirically determined or calculated based on observing the behavior of similar DGAs. If the number of identified NX domains is less than X during the specified time T, then the domain name is not identified as DGA generated and the operation moves back to block 505 to examine the next domain name.

In addition to detecting the existence of DGA based malware in the network and identifying DGA generated domain names, an operation may be used to identify the actual C&C server for the DGA algorithm. One embodiment of such an operation is disclosed in the flow chart of FIG. 6. Operation 600 of FIG. 6 begins (block 605) by trying to get a DNS response for an identified domain name (block 610). The operation then checks to determine if the response indicates a failed or successful resolution (block 615). If the DNS response indicates that the domain name resulted in a successful resolution, the operation checks to see if the source IP list for the domain name is on a watch list (block 620). When the source IP is not on a watch list, the operation moves back to block 605 to examine the next domain name. If the source IP list is on a watch list, then the operation moves to identify the smallest and the largest domain lengths in the NX domain list (block 625). Once the smallest and the largest lengths have been identified, the operation checks to see if the length of the current domain name falls in between the smallest and the largest length (block 630). If not, then the domain name is not likely a DGA generated domain name and as such the operation moves back to block 605 to examine the next domain name.

Figure 6:
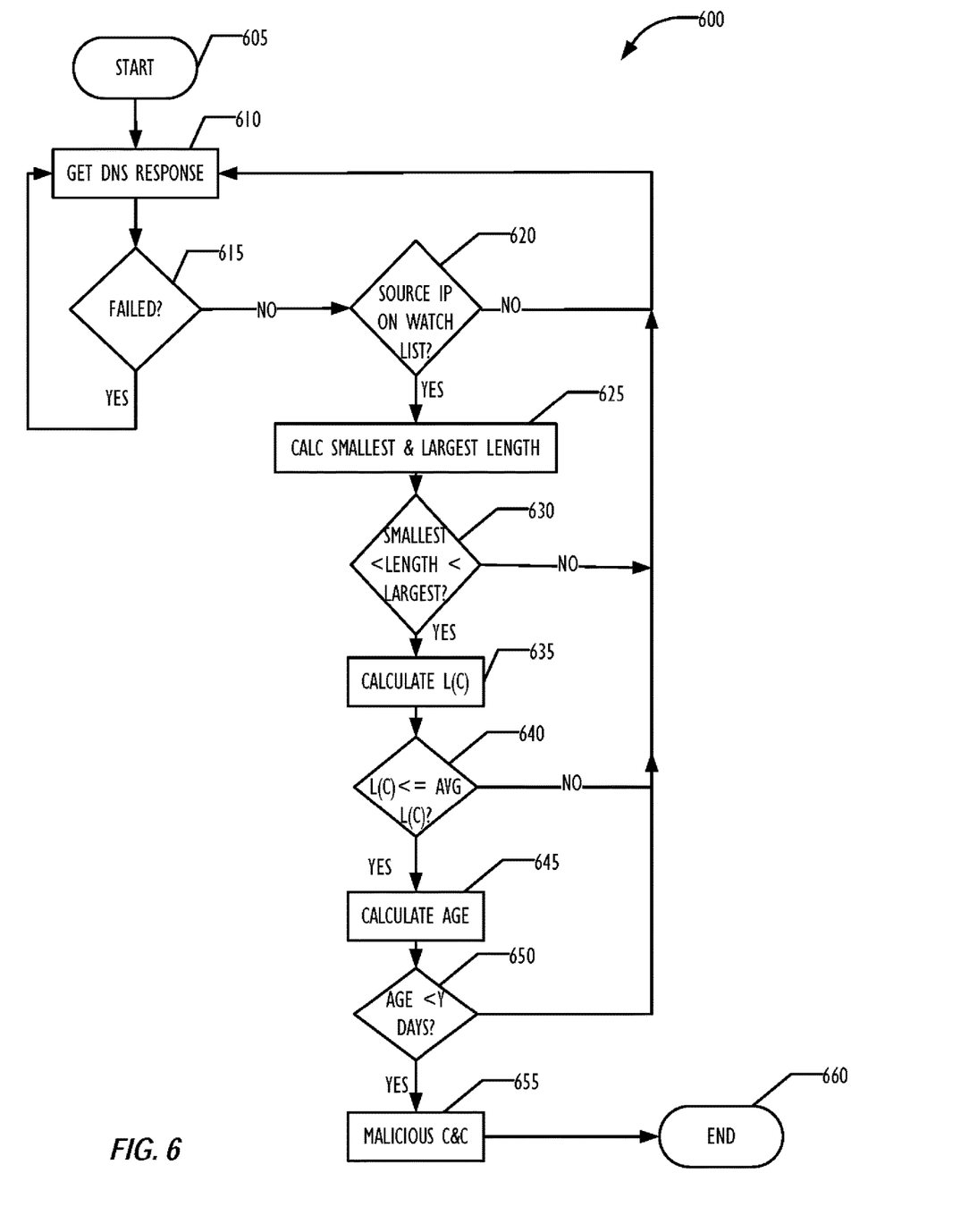
FIG. 6 is a flow diagram for identifying the C&C domain used by domain generation algorithm malware according to one or more disclosed embodiments.

When it is determined that the current domain name falls in between the smallest and the largest length, the lexical complexity score of the domain name is calculated (block 635). The calculated lexical complexity score is then compared to the average lexical complexity score for the domain names in the NX domain list (block 640). When the lexical complexity score is larger than the average score, the domain name is identified as not being a C&C domain and the operation moves back to block 605 to examine the next domain name. However, when the lexical complexity score is smaller or equal to the average lexical complexity score, the operation calculates the age of the domain name (block 645). This may be done based on the domain creation date in the Whois Information. This information is generally public and available with the domain registrar. The age is then calculated as the difference in days between the current date and the date when the domain was first registered or created. Once the age is calculated, the operation determines if the age is less than a specified number of days (block 650). The specified number is determined based on examining the average age of C&C domains and determining a length of time above which most C&C servers do not survive. In one embodiment, this number may be thirty days. When the age is more than the specified number, the operation moves back to block 605 to examine the next domain name. However, if the age is less than the specified number days, the domain server is likely to be the C&C domain for the DGA malware and it is identified as such (block 655), before the operation ends (block 660).

In this manner successfully resolved domain names can be identified as the DGA malware's C&C domain and as such the source of the malware can be identified and removed. Because this procedure relies on parsing the domain names and identifying whether they are random by examining their lexical complexity, it is efficient and highly accurate at identifying DGA domains and their C&C severs and results in fewer false positives.

It is also to be understood that the above description is intended to be illustrative, and not restrictive. For example, above-described embodiments may be used in combination with each other and illustrative process acts may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A computer readable storage disk or storage device comprising instructions to cause a machine to at least:
   capture domain name services queries included in communications on a computer network to detect a communication including a domain name;
   compare characters in the domain name with words in a dictionary to identify a combination of words in the domain name and a subset of the characters that are not in the words;
   determine a count of a number of characters in the combination of words in the domain name, the count does not include remaining characters in the domain name that are not in the words;
   determine a lexical complexity of the domain name based on the combination of words in the domain name excluding the characters that are not in the words;
   based on a determination that the count of the number of characters in the domain name falls within a specified range and a determination that the lexical complexity of the domain name satisfies an average lexical complexity threshold for a list of domain names associated with a domain generation algorithm (DGA):
   query a domain name registrar server to determine an age of the domain name; and
   identify the domain name as a command and control domain of the DGA when the age is less than a second threshold.

2. The computer readable storage disk or storage device of claim 1, wherein the specified range is between a smallest domain name length and a largest domain name length of domain names listed in the list of domain names.

3. The computer readable storage disk or storage device of claim 1, wherein the instructions, when executed, cause the machine to determine if a Domain Name Server (DNS) response indicates the domain name failed resolution.

4. The computer readable storage disk or storage device of claim 1, wherein the instructions, when executed, cause the machine to determine the age based on a domain creation date identified in a WHOIS database.

5. The computer readable storage disk or storage device of claim 1, wherein the instructions, when executed, cause the machine to determine if the domain name is on a source internet protocol (IP) watch list.

6. The computer readable storage disk or storage device of claim 5, wherein the instructions, when executed, cause the machine to determine the age of the domain name when the domain name is on the source IP watch list.

7. The computer readable storage disk or storage device of claim 1, wherein the instructions, when executed, cause the machine to determine the second threshold based on an age of command and control domains criterion.

8. The computer readable storage disk or storage device of claim 1, wherein the instructions, when executed, cause the machine to select the combination of words from a plurality of combinations of words for the domain name based on a determination that the combination of words results in a least number of characters remaining in the domain name after the combination of words is removed as compared with others of the plurality of combinations.

9. A method comprising:
   capturing, by executing an instruction with at least one processor, domain name services queries included in on a computer network to detect a communication including a domain name;
   comparing characters in the domain name with words in a dictionary to identify a combination of words in the domain name and characters that are not in the words;
   determining a count of a number of characters in the combination of words in the domain name, the count does not include remaining characters in the domain name that are not in the words;
   determine a lexical complexity of the domain name based on the combination of words in the domain name excluding the characters that are not in the words;
   based on a determination that the count of the number of characters in the domain name falls within a specified range and a determination that the lexical complexity of the domain name satisfies an average lexical complexity threshold for a list of domain names associated with a domain generation algorithm (DGA):
   querying, by executing an instruction with the at least one processor a domain name registrar server to determine an age of the domain name; and
   identifying, by executing an instruction with the at least one processor, the domain name as a command and control domain of the DGA when the age is less than a second threshold.

10. The method of claim 9, wherein the specified range is between a smallest domain name length and a largest domain name length of domain names listed in the list of domain names.

11. The method as defined in claim 9, further including determining if a Domain Name Server (DNS) response indicates the domain name failed resolution.

12. The method as defined in claim 9, further including determining the age based on a domain creation date identified in a WHOIS database.

13. The method as defined in claim 9, further including determining if the domain name is on a source internet protocol (IP) watch list.

14. The method as defined in claim 13, further including determining the age of the domain name when the domain name is on the source IP watch list.

15. The method as defined in claim 9, further including determining the second threshold based on an age of command and control domains criterion.

\* \* \* \* \*